United States Patent Office
3,799,982
Patented Mar. 26, 1974

3,799,982
N-(β,β-DIFLUORO, α-METHYLPHENETHYL)-FORMAMIDE
Bryan B. Molloy and Ray W. Fuller, Indianapolis, and Kenneth L. Hauser, Greencastle, Ind., assignors to Eli Lilly and Company, Indianapolis, Ind.
No Drawing. Original application July 14, 1971, Ser. No. 162,621, now Patent No. 3,719,713. Divided and this application Oct. 24, 1972, Ser. No. 300,056
Int. Cl. C07c 103/12
U.S. Cl. 260—562 P                                   1 Claim

ABSTRACT OF THE DISCLOSURE

β-Fluoro-β-phenyl-α-methylethylamines useful as sympathomimetic amines with diminished central effects.

CROSS-REFERENCE

This application is a division of my co-pending application, Ser. No. 162,621, filed July 14, 1971, now U.S. Pat. No. 3,719,713.

BACKGROUND OF THE INVENTION

β-Phenyl-α-methylethylamine and β-phenyl-α,α-dimethylethylamine, known as amphetamine and phentermine respectively, are powerful CNS stimulants and also sympathomimetic drugs having effects on both α- and β-receptors. Their pharmacology is well-known since both drugs have been marketed for over 20 years. Various chlorinated amphetamines are also known (see French Pat. BS M–3780 and British Pat. 916,789). β-chloro-β-phenyl-α-methylethylamine has been used as an intermediate in chemical synthesis (see Angew, Chem. Int. Ed. Engl. 1968, 292–293) and has also been prepared in studies of aziridine formation [see Tetrahedron Letters 24, 5677 (1968)]. β-Phenyl-β-hydroxy-α-methylethyl-amine (phenylpropanolamine) is also stated by Goodman and Gilman, The Pharmacological Basis of Therapeutics, 4th ed., 1970, pp. 485, MacMillan (New York) to be a sympathomimetic drug acting on α-receptor sites, useful as a nasal decongestant.

SUMMARY

This invention provides compounds of the formula

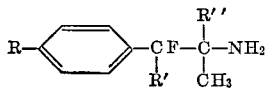

wherein R is hydrogen or halogen; R' is hydrogen or fluorine and R" is hydrogen or methyl. Also included within the scope of this invention are the salts of the amine bases represented by the above formula formed with nontoxic acids. These acid addition salts include salts derived from nontoxic inorganic acids such as: hydrochloric acid, nitric acid, phosphoric acid, sulfuric acid, hydrobromic acid, hydroiodic acid, nitrous acid phosphorus acid and the like, as well as salts of nontoxic organic acids including acetic acid, maleic acid, malic acid, tartaric acid, citric acid, benzoic acid, 2,4-dinitrobenzoic acid, p-chlorobenzoic acid, naphthoic acid, p-toluenesulfonic acid and the like. In the above formula, the term "halogen" includes chlorine, bromine and fluorine.

The monofluorinated compounds, according to the above structure (those in which R' is hydrogen) have two asymmetric carbon atoms and thus exist as two optically active pairs or racemates, generally referred to as the erythro and threo pairs. All such isomers are included within the scope of the above formula.

The difluorinated compounds of the above formula are prepared by dichlorinating a phenylacetonitrile with sulfurylchloride, replacing the chlorines with fluorine using antimony trifluoride, and hydrolyzing the nitrile to yield an acid, α,α-difluorophenylacetic acid or α,α-difluoro-(4-chlorophenyl)acetic acid. The acids are then reacted with methyl lithium to yield the corresponding difluorophenylacetone which, on treatment with formamide and formic acid in a Leuckart reaction, produces the desired amines. α,α-Difluorophenylacetic acid and the corresponding 4-chloro derivative can also be prepared by the action of sulfur tetrafluoride on a phenylglyoxylic ester followed by hydrolysis of the ester.

Alternatively, α-bromopropiophenone can be treated with sulfurtetrafluoride to yield the corresponding difluorobromo compound which on treatment with sodium azide yields a β,β-difluoro-β-phenyl-α-methylethylazide which on reduction with sodium borohydride yields the desired compounds.

Those compounds in which R' is hydrogen are prepared from the 1-fluoro-1-phenyl-isopropylbromide which on treatment with sodium azide yields the corresponding azido compound. Reduction of this compound as above with borohydride yields the desired amine.

The compounds of this invention are sympathomimetic amines and affect both α- and β-receptor sites. Although similar in action to amphetamine, because of their unique fluorinated structure, the compounds exhibit a relatively greater peripheral action and have less CNS excitatory action than amphetamines. Thus the compounds are potentially useful in treating such peripheral phenomena as nasal congestion, and will cause lipid mobilization as amphetamine does. They are particularly useful as anorectic drugs because they cause a marked diminution in appetite and an increase in lipid mobilization without the degree of central stimulation which accompanies the use of amphetamines and constitute its most undesirable side-effect. The compounds of the invention are orally active and can be employed in the same pharmaceutical forms as amphetamines including tablets, capsules, nasal sprays, liquids, and the like.

This invention is further exemplified as follows:

EXAMPLE 1

β,β-Difluoro-β-phenyl-α-methylethylamine 300 ml. of sulfuryl chloride were placed in a 2 l. flask equipped with addition funnel, stirring means and drying tube. 234 g. of phenylacetonitrile were added and the mixture stirred overnight at room temperature. Excess sulfuryl chloride was removed by heating to 100° C. Distillation of the residue yielded dichlorophenylacetonitrile formed in the above reaction. B.P.=86–91° C. at 8 mm./hg. Yield=322 g.

90 g. of α,α-dichlorophenylacetonitrile were added to 105 g. of antimony trifluoride in a 1 l. flask. The mixture was heated and a distillate boiling in the range 100–150° C. was collected. The distillate was washed 7 times with 2 N aqueous hydrochloric acid and dried. Redistillation through a jacketed Vigreaux column at atmospheric pressure, yielded α,α-difluorophenylacetonitrile. B.P.=147–150° C.

A mixture of 50 ml. of concentrated sulfuric acid and 10 g. of α,α-difluorophenylacetonitrile were stirred at room temperature overnight and then poured onto ice. Crystalline α,α-difluorophenylacetamide formed in the above reaction separated as a crystalline mass and was isolated by filtration. The recovered amide was dissolved in 250 ml. of 10% aqueous sodium hydroxide and the mixture refluxed overnight. The cooled reaction mixture was extracted 3 times with ether, and the ether extracts discarded. The aqueous phase was acidified with 2 N sulfuric acid and α,α-difluorophenylacetic acid formed in the reaction was extracted from the acidic solution with ether. The ether layer was separated. Evaporation of the ether therefrom yielded α,α-difluorophenylacetic acid as a residue, melting at 74–75° C. after repeated recrystallization from hexane.

1.72 g. of α,α-difluorophenylacetic acid were dissolved in 25 ml. of ether and the solution placed in a 100 ml. flask equipped with condenser, drying tube, stirring means, and addition funnel. 13.7 ml. of a 5.08% methyl lithium solution in ether was added through the funnel to the ether solution which had been chilled to below 20° C. After the addition had been completed, the reaction mixture was allowed to warm to room temperature at which temperature it was stirred for about 2 hours. 10 ml. of a saturated ammonium chloride solution was added slowly with stirring. The ether layer was separated and the aqueous layer was extracted twice with 25 ml. portions of ether. The ether layers were combined, washed successively with a saturated ammonium chloride solution, twice with water, and with a saturated sodium chloride solution. The ether layer was dried and the ether removed in vacuo, leaving as a residue 1,1-difluoro-1-phenylacetone.

Employing a modified Leuckart reaction, a mixture of 1.2 g. of 1,1-difluoro-1-phenylacetone, 1.28 ml. of formamide and 0.8 ml. of formic acid was prepared in a 25 ml. flask equipped as above. The mixture was heated at 160° C. for about 20 hours and then cooled. 10 ml. each of water and ether were added, the ether layer separated and the aqueous layer extracted 3 times with 10 ml. portions of ether. The ether extracts were combined, washed with water, with 10% sodium carbonate with saturated aqueous sodium chloride and then dried. Evaporation of ether in vacuo left as a residue N-formyl-β,β-difluoro-β-phenyl-α-methylethylamine. This residue was refluxed overnight with 50 ml. of 10% aqueous hydrochloric acid, thus deformylating the amine and converting it to the hydrochloride salt. The reaction mixture was treated with 75 ml. of 10% aqueous sodium carbonate in the cold. The basic solution was then extracted 3 times with chloroform, the chloroform extracts combined and washed with 10% aqueous sodium carbonate solution and then treated with 1 N aqueous hydrochloric acid, thus extracting the amine base into the aqueous layer as the hydrochloride salt. Evaporation of the aqueous layer in vacuo yielded β,β-difluoro-β-phenyl-α-methylethylamine hydrochloride which melted at about 192–194° C. after recrystallization from ethyl acetate.

*Analysis.*—Calc'd: C, 52.05; H, 5.83; N, 6.75; Cl, 17.08; F, 18.30. Found: C, 51.94; H, 5.74; N, 6.95; Cl, 16.90; F, 18.10.

β,β-Difluoro-β-phenyl-α-methylethylamine free base is prepared from the hydrochloride salt by adding an equivalent amount of base such as dilute sodium hydroxide to an aqueous solution of the salt, extracting the free base into ether, separating the ether layer and removing the ether by evaporation in vacuo, leaving the free base as a residue.

In accordance with the above procedure, 4-chlorophenylacetonitrile was treated with sulfuryl chloride to yield α,α-dichloro-4-chlorophenylacetonitrile boiling at 110–115° C. 9 mm./Hg. Treatment of the dichloro compound with antimony trifluoride yielded α,α-difluoro-4-chlorophenylacetonitrile which was isolated by distillation. The difluoro nitrile was then converted to the amide by treatment with sulfuric acid. α,α-Difluoro-4-chlorophenylacetamide thus prepared melted at 166–167° C. The amide was hydrolyzed by treatment with sodium hydroxide to α,α-difluoro-4-chlorophenylacetic acid which melted at 86–88° C. after recrystallization from hexane. Treatment of the acid with methyl lithium yielded 1,1-difluoro-1-(4-chlorophenyl)acetone. Subjection of the above ketone to a Leuckart reaction to yield a N-formyl derivative which on treatment with acid gave β,β-difluoro-β-(4-chlorophenyl)-α-methylethylamine hydrochloride melting at about 233–235° C.

*Analysis.*—Calc'd: C, 44.65; H, 4.58; N, 5.79; Cl, 29.29; F, 15.70. Found: C, 44.43; H, 4.80; N, 5.81; Cl, 29.10; F, 15.88.

β,β-Difluoro-β-(4-chlorophenyl)-α-methylethylamine free base is prepared from the hydrochloride salt as indicated above for the corresponding 4-phenyl derivative.

EXAMPLE 2

β-Fluoro-β-phenyl-α-methylethylamine

A solution was prepared from 195 g. of liquid hydrogen fluoride in 590 ml. of ether at −80° C. To this solution was added slowly a second solution containing 209 g. of pyridine in 520 ml. of ether, thus forming a pyridine-hydrogen fluoride salt. The mixture was allowed to warm to room temperature. Next 100 g. of β-methyl-styrene and 100 g. of N-bromoacetamide were added in alternate 25 g. portions over a 2 hour period. The reaction mixture was stirred at room temperature for 48 hours. A solution of 1.5 pounds of sodium carbonate in 2 l. of water was layered with ether and this mixture added cautiously to the above reaction mixture. The ether layer was separated and the aqueous layer extracted with several portions of ether. The ether extracts were combined, washed with water and then treated with a saturated solution of sodium nitrite in water. The aqueous layer was acidified and the mixture shaken. The aqueous layer was then separated and the ether layer washed several times with water followed by a wash with a 10% sodium carbonate solution. The ether solution was dried and the ether removed in vacuo. Distillation of the residue yielded 1-phenyl-1-fluoro-2-bromo-propane distilling in the range 109–111° C. 0.5 mm./Hg.

21.7 g. of the above bromofluoro compound were dissolved in 200 ml. of dimethylformamide (DMF). A solution of 9.75 g. of sodium azide in 50 ml. of water was added and the mixture heated to refluxing temperature for 24 hours. The bulk of the DMF was removed by evaporation in vacuo. The residue was taken up in water and the water layer extracted with benzene. The benzene extract was washed with water and a saturated sodium chloride solution and then dried. Evaporation of the benzene in vacuo left as a yellow liquid residue 1-fluoro-1-phenyl-isopropylazide formed in the above reaction.

The 12.5 g. of the above azide was dissolved in 250 ml. of isopropanol; 6 g. of sodium borohydride was slurried into the solution which was then refluxed for 24 hours. The reaction mixture was partitioned between chloroform and water. The chloroform layer was washed with water and then extracted with 3 200 ml. portions of 2 N aqueous hydrochloric acid. Evaporation of the acidic aqueous layer yielded white crystalline material. β-Fluoro-β-phenyl-α-methylethylamine hydrochloride thus prepared melted at about 195–196° C. after recrystallization from isopropanol.

*Analysis.*—Calc'd: C, 56.99; H, 6.91; N, 7.39; F, 10.02; Cl, 18.70. Found: C, 56.77; H, 7.07; N, 7.21; F, 8.52; Cl, 18.95.

β-Fluoro-β-phenyl-α-methylethylamine free base is prepared by the procedure utilized for the preparation of the corresponding isopropylamine free base as set forth in Example 1.

EXAMPLE 3

β,β-Difluoro-β-phenyl-α-methylethylamine— Alternate procedure

A reaction mixture was prepared containing 21.3 g. of α-bromopropiophenone, 43.2 g. of sulfur tetrafluoride and 0.5 ml. of water, as a catalyst. The reaction mixture was placed in a bomb which was rocked at room temperature for about 40 hours. Ether was added and the ether solution containing 1,1 - difluoro-1-phenyl-2-bromopropane formed in the above reaction was washed successively with water, a saturated sodium bicarbonate solution, and a saturated sodium chloride solution. The ether extract was dried and the ether removed by evaporation in vacuo, leaving 22 g. of an oil consisting of 1,1-difluoro-1-phenyl-2-bromopropane. 11.75 g. of the above oil in 100 ml. of DMF was treated with 4.88 g. of sodium azide in 25 ml. of water. The mixture was refluxed for 24 hours and the volatile constituents removed by evaporation in vacuo. The residue, consisting of 1,1-difluoro-1-phenyl-isopropyl-azide, was taken up in a mixture of water and benzene. The benzene layer was separated and the water layer extracted twice more with benzene. The benzene extracts were combined and washed with water and a saturated sodium chloride solution. Evaporation of the benzene yielded 7.8 g. of the above azide as an oil. The azide was dissolved in 100 ml. of isopropyl alcohol to which was added 3.8 g. of sodium borohydride. The reaction mixture was heated at refluxing temperature overnight and was then cooled. Evaporation of the solvent in vacuo yielded a solid which was taken up in a mixture of ice and 2 N aqueous hydrochloric acid. The acidic layer was extracted 3 times with ether and the ether extracts discarded. The acidic layer was then made basic with 10% sodium carbonate and $\beta,\beta$-difluoro-$\beta$-phenyl-$\alpha$-methyl-ethylamine, formed in the above reaction, was extracted into ether. The basic layer was extracted twice more with ether, and the ether extracts combined and washed with a 10% sodium carbonate solution. The ether solution was then extracted 3 times with 50 ml. portions of 2 N aqueous hydrochloric acid. The acidic extracts were combined, washed with ether, and the water removed by evaporation in vacuo. The residue, comprising $\beta,\beta$-difluoro-$\beta$-phenyl-$\alpha$-methylethylamine hydrochloride, melted at about 186–188° C. after recrystallization from ethyl acetate.

Following the above procedure, $\alpha$-bromo-$\alpha$-methylpropiophenone can be transformed into $\beta,\beta$-difluoro-$\beta$-phenyl-$\alpha,\alpha$-dimethylethylamine, isolated as the hydrochloride salt.

EXAMPLE 4

Preparation of salts

Salts of the free bases of this invention, other than the hydrochloride salts whose preparation is illustrated in Examples 1 and 2, are prepared by dissolving the free base in ether and adding an equivalent of a suitable non-toxic acid, also in ether. The salts thus formed, as for example the sulfate and phosphate salts, are insoluble in ether and can be isolated by filtration. Alternatively, the amine base can be dissolved in ethanol and an equivalent of the acid added as an ethanolic solution. In this instance, since the salts thus formed are soluble in the reaction mixture, they are isolated by evaporation of the solvent in vacuo. Salts which can be formed by the above procedure include the hydrochloride, sulfate, hydrobromide, phosphate, hydrogen phosphate, dihydrogen phosphate, acetate, maleate, succinate, tartrate, citrate, benzoate, and p-toluene sulfonate salts of $\beta,\beta$-difluoro-$\beta$-phenyl isopropylamine and the corresponding monofluoro derivatives.

We claim:
1. A compound of the formula

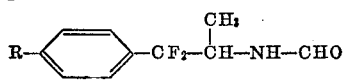

wherein R is hydrogen or halogen.

References Cited

UNITED STATES PATENTS 3,308,019  3/1967  Kopf et al. _____ 167—55

HENRY R. JILES, Primary Examiner

M. A. M. CROWDER, Assistant Examiner

U.S. Cl. X.R.

424—324